US005288558A

United States Patent [19]

Nöthe

[11] Patent Number: 5,288,558

[45] Date of Patent: Feb. 22, 1994

[54] ATTACHMENT FOR VIDEO SCREENS HAVING DUAL OPTICAL ACTIVE DEREFLECTION LAYERS

[75] Inventor: Axel Nöthe, Castrop-Rauxel, Fed. Rep. of Germany

[73] Assignee: Flachglas Aktiengesellschaft, Bayern

[21] Appl. No.: 944,109

[22] Filed: Sep. 11, 1992

[30] Foreign Application Priority Data

Sep. 13, 1991 [DE] Fed. Rep. of Germany ....... 4130930

[51] Int. Cl.[5] ............................................. B32B 17/06

[52] U.S. Cl. .................................... 428/426; 428/215; 428/216; 428/428; 428/432; 428/433; 428/434; 428/469; 428/472; 428/472.1; 313/478; 313/479; 313/480; 313/489

[58] Field of Search ............... 428/426, 432, 433, 434, 428/428, 469, 472, 472.1, 215, 216, 621, 630, 655; 313/478, 479, 480, 489

[56] References Cited

U.S. PATENT DOCUMENTS 3,532,919 10/1970 Fujimoto ............................ 313/474
3,720,541 3/1973 King .................................... 428/428
3,935,351 1/1976 Franz .................................. 428/433
4,235,048 11/1980 Gillery ............................... 428/433
4,468,420 8/1984 Kawahara .......................... 428/428
4,882,212 11/1989 SinghDeo .......................... 428/432
4,926,090 5/1990 Rein .................................... 313/478

FOREIGN PATENT DOCUMENTS 0293470 6/1990 European Pat. Off. .

*Primary Examiner*—Ellis P. Robinson
*Assistant Examiner*—Timothy M. Speer
*Attorney, Agent, or Firm*—Sughrue, Mion, Zinn, Macpeak & Seas

[57] ABSTRACT

An attachment for a video screen of a cathode ray tube of a monitor or TV receiver is constituted by a glass pane having on a front side, facing away from the video screen, a multilayer anti-reflective coating. If necessary, the glass pane on a rear side, facing towards the video screen, may incorporate an absorptive coating. The anti-reflective coating is limited to two active dereflective layers. One of said two layers is a metal layer of gold or a metal alloy with a gold content of more than 50% and with a thickness of 4 to 10 nm. The second active dereflective layer is of dielectric material with a refractive power of $n<1.8$ and constituting an interference layer which faces away from the glass pane and which is essentially absorption-free and forms an anti-reflective layer for the visible region of the spectrum.

9 Claims, 3 Drawing Sheets

ATTACHMENT FOR VIDEO SCREENS HAVING DUAL OPTICAL ACTIVE DEREFLECTION LAYERS

FIELD OF THE INVENTION

The invention concerns an attachment for video screens or the like, such as cathode ray tubes of monitors, TV sets or the like, with a glass pane which has on its front side, facing away from the video screen or the like, a multilayer anti-reflective coating and if necessary on its rear side, facing towards the video screen or the like, a reflection-reducing coating and in particular an absorbent coating (or the like).

BACKGROUND OF THE INVENTION

In the case of computer monitors, TV sets and the like, there is frequently a need for reflection reduction of the cathode ray tubes used. This aim can be achieved for example by etching the surface, coating the tube or also by means of anti-reflectively coated attachments. The coating used for such attachments should have a low surface resistance so as to be able to act as a shield against electromagnetic radiation. For this purpose, an electrical surface resistance of less than 100 ohms is generally necessary.

Hitherto, the following have been used as blooming layers for attachments: single layers, with the disadvantage of residual reflection, of an intense colour effect as well as deficient electrical conductivity; double layers with the disadvantages of an intense colour effect and low conductivity; dielectric multilayer systems with the disadvantages of high production cost and high electrical resistance; and conductive multilayer systems which are particularly costly to produce and are thus expensive.

Double layer systems for attachments rendering it possible to achieve satisfactory reflection elimination over wide regions of the visible spectrum are not known. To the contrary, the use of such simple layer systems is always accompanied by an intense colour effect. To reduce the colour cast therefore, multilayer systems are used, which result in much higher production cost.

From DE-OS 36 29 996, an attachment of the generic type is known, where the glass pane, as also is the case with the invention, can consist either of inorganic glass, in particular of toughened safety glass, or also of plastic, i.e. organic glass, incorporates on the back thereof, an absorption coating of for example chromium and on the front an anti-reflective coating of two or three layers of differing refractive index, whereby the neutrality of the colour effect, as well as the production cost leaves much to be desired.

From US-PS 2 366 687, an anti-reflective coating for glass panes is known, where a metal layer of a material with a high reflection but low absorption factor and a dielectric interference layer of for example $SiO_2$ are applied consecutively to the glass panes. Usable metals are specified as copper, silver, rhodium, aluminium or other similarly stable metals with the aforementioned properties. The use of such an anti-reflective coating for attachments of the generic type leads, if metals other than copper are chosen, to an undesirably high colour effect, whilst the use of copper is ruled out on account of its lack of stability for front coatings of attachments of the type in question here.

In GB-PS 826 754, electrically conductive coatings on glass panes are described which as a metal layer, can contain alternatively a gold, silver, nickel or iron layer and as part of an outer anti-reflective layer can contain $SiO_2$ for example, whereby the intense colour effect occurring except when using gold can be taken into account in the application stated there and no indication is given as to how to produce a neutral colour effect by suitable selection of material.

A similar attachment as is described in accordance with the generic state of the art in DE-OS 39 41 797, with the problems explained with the aid of the above mentioned Patent Specification. DE-PS 21 38 517 concerns a thermal insulation pane with a coating of gold and high refractive index dielectric material, where the use of such a coating with an attachment of the generic type would not permit the desired reflection reduction.

SUMMARY OF THE INVENTION

The purpose of the invention is to provide an attachment of the generic type whose anti-reflective coating with cost-effective production permits a reduction of the light reflection factor of the front of the glass pane from approx. 4% to less than 0.5%, is to a large extent neutral in colour and possesses a surface resistance of less than 100 ohms.

This problem is solved by the invention by the anti-reflective coating comprising a metal layer of gold or a metal alloy with a gold content of more than 50% with a thickness of 4 to 10 nm and an interference layer located on its side facing away from the glass pane which is essentially absorption-free, forming an anti-reflective layer for the visible region of the spectrum, of dielectric material with a refractive power of $n < 1.8$.

It can be provided for the thickness of the metal layer being 5 to 7 nm.

Furthermore, the invention proposes that the optical thickness of the interference layer should be 60 to 140 nm.

According to a further embodiment of the invention, it can be provided for the interference layer consisting of at least a metal oxide or metalloid oxide.

It can be provided for the interference layer consisting of $SiO_2$.

A further embodiment of the invention is characterized by the fact that (in each case) an adhesive layer is located between the glass pane and the metal layer and/or between the metal layer and the interference layer.

NiCr, silicon, indium oxide and/or indium-tin oxide may be used as material for the adhesive layer(s).

The invention also proposes that at least a part of the layers of the anti-reflective coating is produced by magnetron cathode sputtering.

The invention is based on the surprising principle that as a result of the interplay between the metal and the interference layer according to the invention, an unexpectedly neutral-coloured reflection elimination effect for a double layer system can be achieved. This effect is apparently based on the characteristic of the complex refractive index of gold which is unusual for metals, which is characterized by the fact that its real component decreases significantly as a monotonic function in the region of the visible spectrum.

No inducement for such a choice of material was gathered from the state of the art discussed at the beginning because although US-PS 2 366 687 mentions copper, whose refractive index possesses a characteristic similar to that of gold, in comparison as regards effect with silver, rhodium and aluminium, their refractive index is quite different and behaves in a way which is useless for the invention, whilst GB-PS 826 754 describes gold as acting in the same way as inter alia silver, nickel and iron, whose refractive index characteristic also renders these metals unsuitable for the purpose of the invention. DE-PS 21 38 517 on the other hand specifies the use of gold in combination with a high refractive index anti-reflective layer, whilst the purpose of the invention can only be achieved by a combination of the gold layer and the low refractive index interference layer in the sense of the anti-reflective coating claimed.

It lies within the scope of the invention to embed the gold or gold alloy layer on both sides in thin adhesive layers in known fashion. When manufacturing the layer system by means of magnetron cathode sputtering, as is provided for more advantageously, it is advisable to use thin adhesive layers of NiCr, silicon, indium oxide or indium-tin oxide, as the adhesion of the anti-reflective coating can be significantly improved thereby.

Further features and advantages of the invention are shown by the specification below, in which embodiments are explained in detail with the aid of the schematic drawings.

DESCRIPTION OF THE PREFERRED EMBODIMENT

Figure 1:
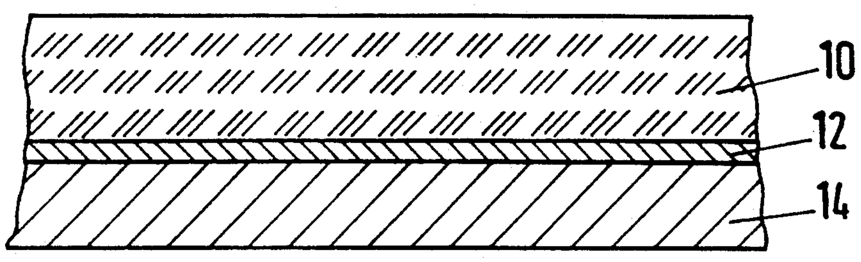
FIG. 1 is a sectional view of a first embodiment of an attachment according to the invention sectioned perpendicular to the plane of the glass pane used.

In the case of the embodiment shown in FIG. 1, a gold layer 12 with a thickness of 5 nm and an essentially absorption-free interference layer 14 of $SiO_2$ with a thickness of 7 nm have been applied consecutively by magnetron cathode sputtering to a transparent glass pane 10, consisting in the example shown of a float glass pane of soda lime silicate glass 6 mm thick.

Figure 2:
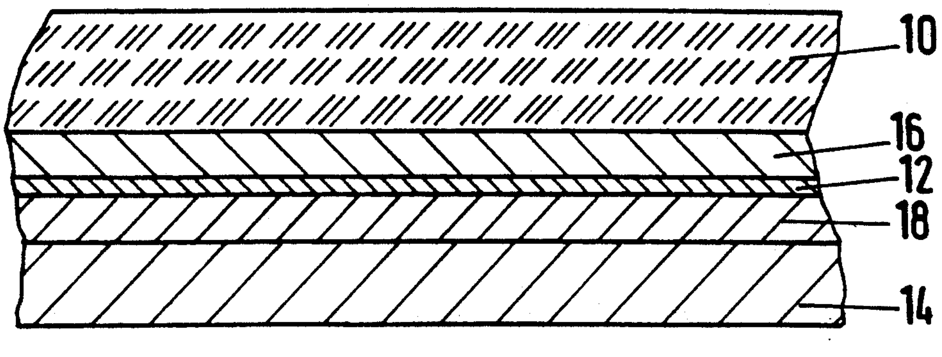
FIG. 2 is a sectional view of a modified representation as per FIG. 1 of a second embodiment of an attachment according to the invention.

In the case of the embodiment of FIG. 2, where the glass pane 10 again consists of a float glass pane of soda lime silicate glass with a thickness of 4 mm, an NiCr adhesive layer 16 with a thickness of 0.5 nm, a gold layer 12 with a thickness of 6 nm, an $In_2O_3$ adhesive layer 18 doped with $SnO_2$ with a thickness of 4 nm and an interference layer 14 of $SiO_2$ with a thickness of 60 nm are consecutively applied to the glass pane 10.

In detail, the manufacture of the attachment in accordance with FIG. 2 was carried out as follows:

In a vacuum coating plant which was equipped with coating devices for magnetron cathode sputtering, the following layers were applied consecutively to the glass pane 10, a float glass pane of soda lime silicate glass of 4 mm thickness of format 40 cm×40 cm: the adhesive layer 16 in the form of an NiCr adhesive layer 0.5 nm thick by sputtering of an NiCr (80/20) target in argon atmosphere at a pressure of $1.5* 10^{-1}$ Pa, the gold layer 12 of 6 nm thickness by sputtering a gold target in argon atmosphere at a pressure of $1.5*10^{-1}$ Pa, the adhesive layer 18 in the form of an $In_2O_3$ adhesive layer doped with $SnO_2$ with a thickness of 4 nm by reactive sputtering of the In90/Sn10 target in argon/oxygen atmosphere at a pressure of $3.5*10^{-1}$ Pa and finally the interference layer 14 in the form of an $SiO_2$ 60 nm thick by reactive sputtering of an Si target in argon/oxygen atmosphere at a pressure of 1.5 Pa. The back of the glass pane 10, not shown in the drawing, was coated with a light absorbing Cr layer of a thickness such that the transmission of an uncoated float glass pane was reduced by approx. one third.

The coated pane possessed a light reflection factor with normal light Type A of 0.21%. Transmission was 55%. The spectrum loci in reflection, measured at L, a, b colour system (according to R. S. Hunter, Photoelectric Color Difference Meter, in J. Opt. Soc. Am. 48 (1958), p. 985 et seq) were $a=0.5$ and $b=-1.0$. The electrical surface resistance of the front anti-reflective coating was 30 ohms.

Figure 3:
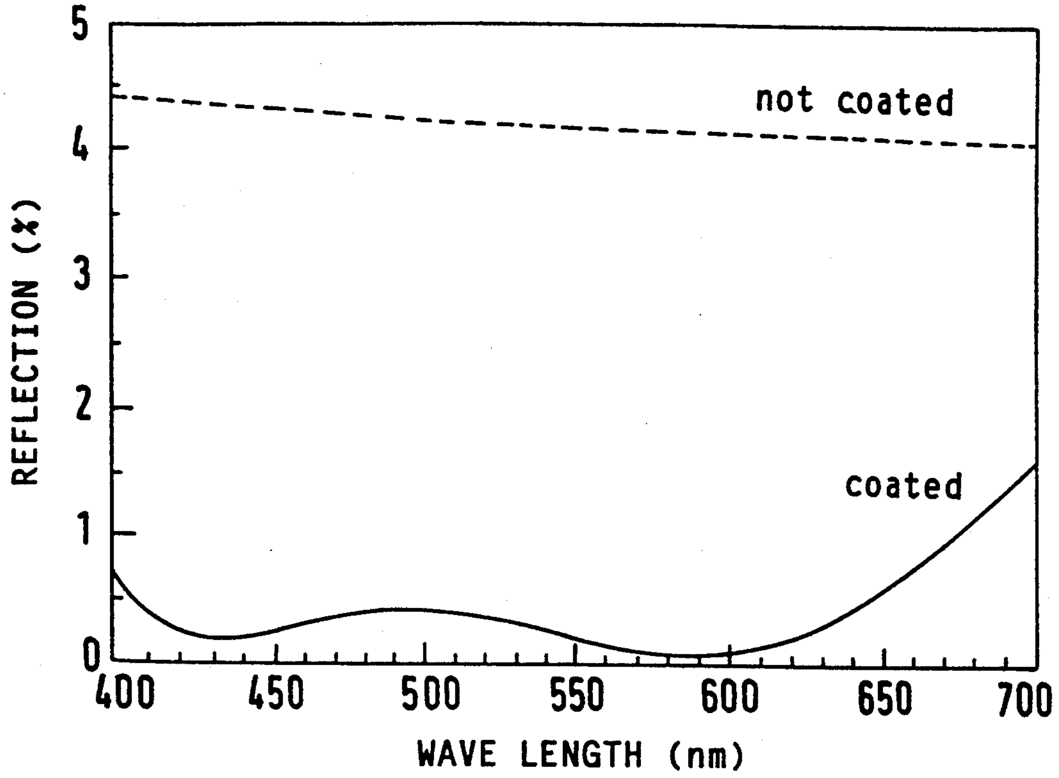
FIG. 3 is a plot of the light reflection factor of the attachment as per FIG. 2 as a function of the wavelength.

In FIG. 3, it can be seen that the light reflection factor of the pane over the entire visible range of the spectrum is clearly lower than that of an uncoated pane.

Figure 4:
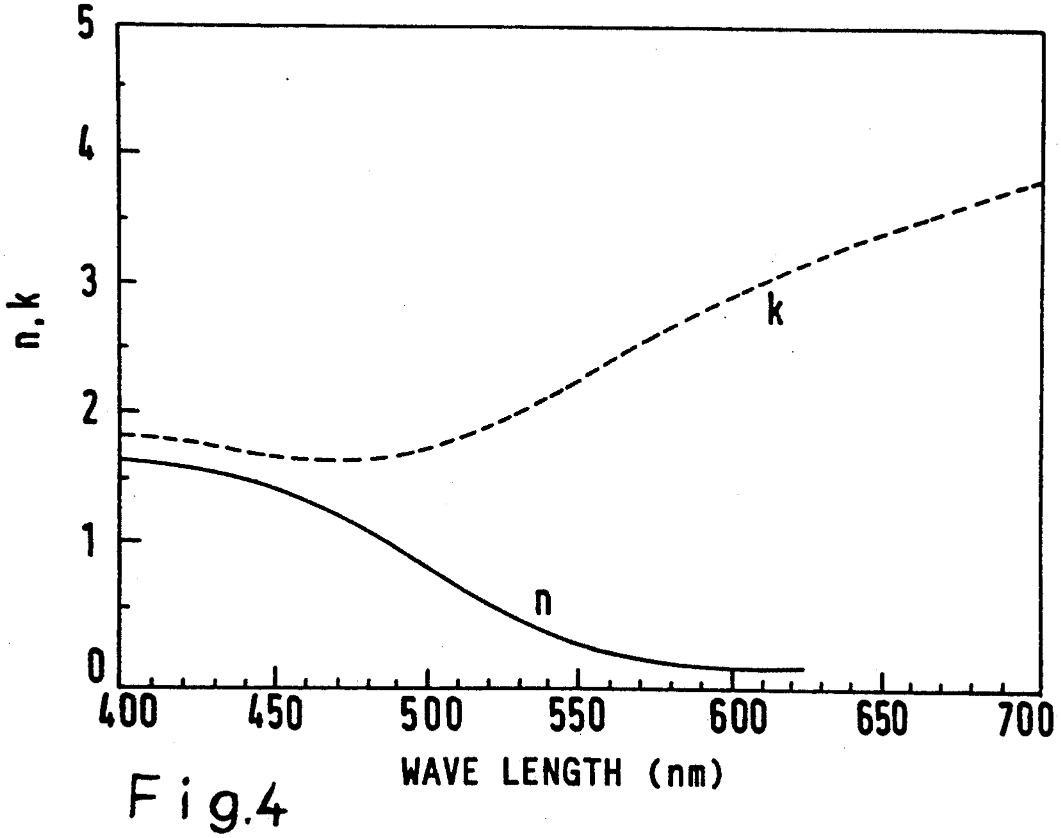
FIG. 4 is a plot of the characteristic of the real component and of the imaginary component of the refractive index of gold as a function of the wavelength.

FIG. 4 shows that the real component of the complex refractive index of gold decreases significantly as a monotonic function over the region of the visible spectrum, to which the surprising effect of the attachment according to the invention, in combination with the low refractive index interference layer used, is significantly attributable.

Figure 5:
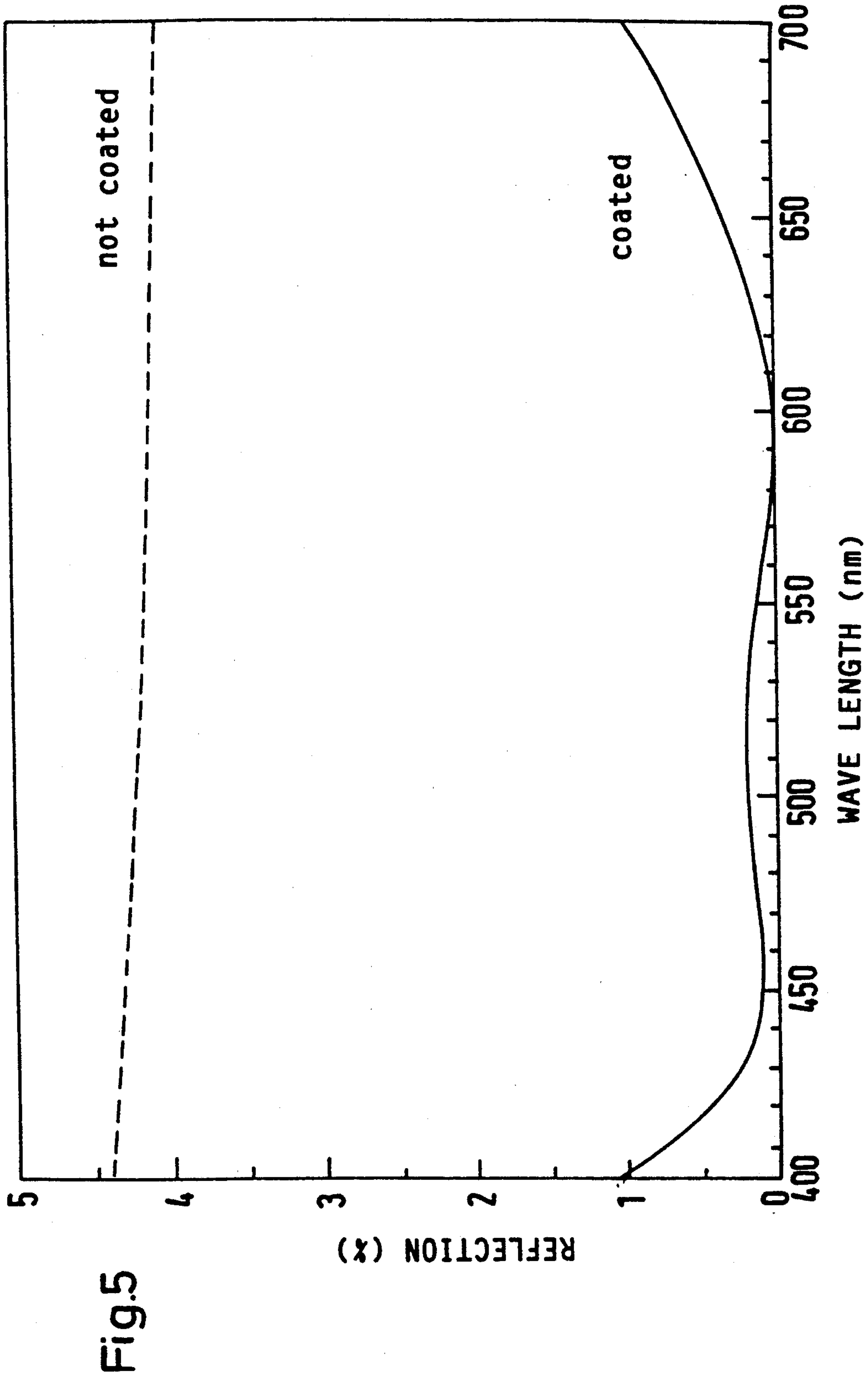
FIG. 5 is a plot of the light reflection factor as a function of wavelength with respect to a second embodiment of the invention, according to FIG. 2.

FIG. 5 shows that, by optimizing layer arrangement and layer dimension, i.e. thickness, according to the second embodiment as shown in FIG. 2, the optical characteristics which have been shown to be very good with respect to the first embodiment according to FIG. 2 can be exceeded. The light reflection factor is, in comparison with FIG. 3, practically in the entire represented wavelength range, lower. The neutrality in colour is further improved at the same time.

The features of the invention disclosed in the foregoing specification, in the drawing and in the claims can be essential both individually and also in any combination for the implementation of the invention in its various embodiments.

I claim:

1. Video screen attachment for attachment to a cathode ray tube of a monitor or TV receiver comprising:

- a glass pane having a first side facing away from a video screen ad an opposite rear side,
- a multilayer anti-reflective coating of no more than two active dereflective layers on said first side of said glass pane comprising:
  - (1) a metal layer (12) of gold or a metal alloy of gold content in excess of 50% of a thickness of 4 to 10 nm, and
  - (2) an interference layer (14) of a dielectric material with a refractive power of $n<1.8$ on said metal layer on the side facing away from said glass pane (10), which is essentially absorption-free and forming an anti-reflective layer for the visible region of the spectrum.

2. Attachment in accordance with claim 1, further comprising a light absorbent coating on the rear side of said glass pane.

3. Attachment in accordance with claim 1, characterized by the fact that the thickness of the metal layer (12) is 5 to 7 nm.

4. Attachment in accordance with claim 1, characterized by the fact that the optical thickness of the interference layer (14) is 60 to 140 nm.

5. Attachment in accordance with claim 1, characterized by the fact that he interference layer (14) comprises a metal or metalloid oxide.

6. Attachment in accordance with claim 5, characterized by the fact that the interference layer (14) consists of $SiO_2$.

7. Attachment in accordance with claim 1, characterized by the fact that an adhesive layer (16, 18) is located between the glass pane (10) and the metal layer (12) and between the metal layer (12) and the interference layer (14).

8. Attachment in accordance with claim 7, wherein said adhesive layer is one material form the group consisting of NiCr, silicon, indium oxide and indium-tin oxide.

9. Attachment in accordance with claim 1, characterized by the fact that at least a part of the layers (12, 14, 16, 18) of the antireflective coating is produced by magnetron cathode sputtering.

* * * * *